(12) United States Patent
Basile et al.

(10) Patent No.: US 6,497,176 B2
(45) Date of Patent: Dec. 24, 2002

(54) MEAT INJECTION MACHINE

(75) Inventors: Vincent L. Basile, West Des Moines, IA (US); Craig A. Smiens, Ankeny, IA (US); Daniel W. Pfeffer, West Des Moines, IA (US); Michael S. Simpson, Norwalk, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/126,400

(22) Filed: Apr. 19, 2002

(65) Prior Publication Data

US 2002/0152901 A1 Oct. 24, 2002

Related U.S. Application Data

(60) Provisional application No. 60/285,353, filed on Apr. 20, 2001.

(51) Int. Cl.[7] .............................. A23L 1/00; A23L 1/31; A22C 17/00
(52) U.S. Cl. .............................. 99/533; 99/532; 99/535
(58) Field of Search ........................... 99/487, 532–535, 99/516; 426/281, 323, 574, 641; 452/62, 66, 57

(56) References Cited

U.S. PATENT DOCUMENTS

| | | | | | |
|---|---|---|---|---|---|
| 3,687,058 | A | * | 8/1972 | Townsend | .................. 99/533 X |
| 3,922,357 | A | * | 11/1975 | Townsend | ................... 426/281 |
| 4,286,510 | A | * | 9/1981 | Prosenbauer | .................. 99/533 |
| 4,453,460 | A | * | 6/1984 | Rabe et al. | .................... 99/533 |
| 4,620,478 | A | * | 11/1986 | Corminas | .................... 99/533 |
| 4,622,892 | A | * | 11/1986 | Corominas | ................ 99/535 X |
| 5,442,997 | A | * | 8/1995 | Branz et al. | .............. 99/533 X |
| 5,881,640 | A | * | 3/1999 | Raevsager | ................ 99/487 X |
| 6,386,099 | B1 | * | 5/2002 | Otsuka et al. | ................. 99/487 |

FOREIGN PATENT DOCUMENTS

EP 0 396 847 B1 10/1989

* cited by examiner

Primary Examiner—Timothy F. Simone

(57) ABSTRACT

A meat injection machine has a frame, and a vertically movable head thereon. A horizontal conveyor is on the frame, and a plurality of injector needles are positioned over the conveyor. A plurality of vertically disposed needles are on the conveyor. Means are provided for connecting the needles to a source of fluid. The modules are in longitudinal and lateral staggered positions over the conveyor.

26 Claims, 17 Drawing Sheets

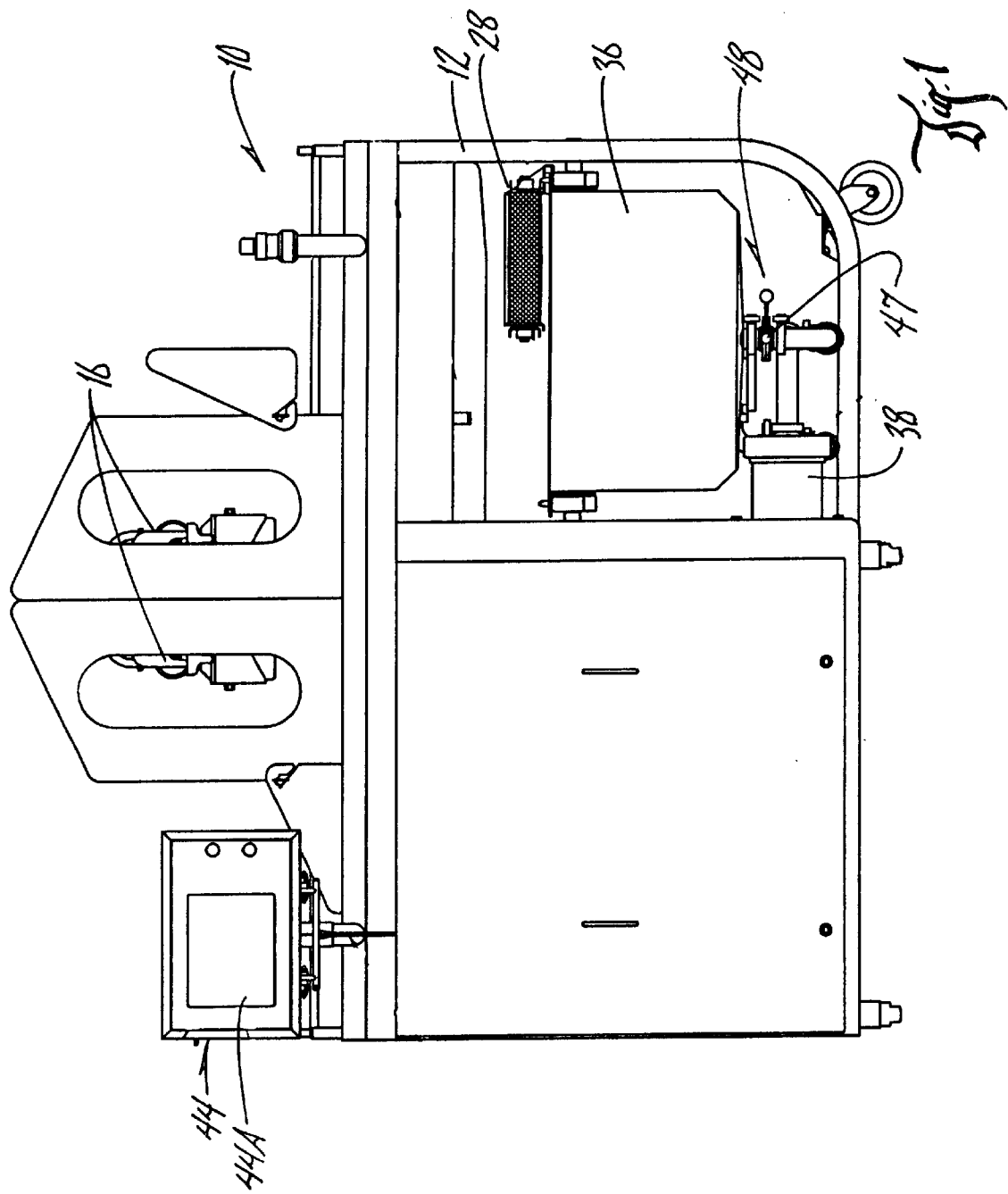

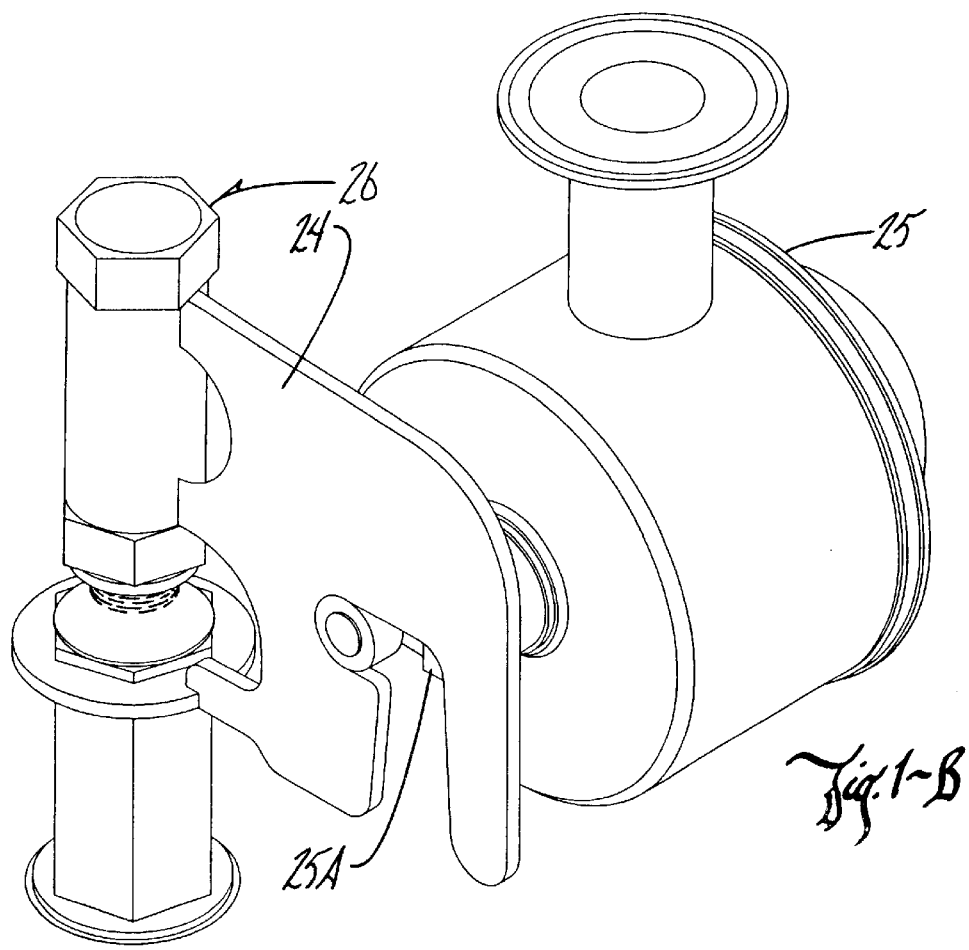
Fig. 1-B
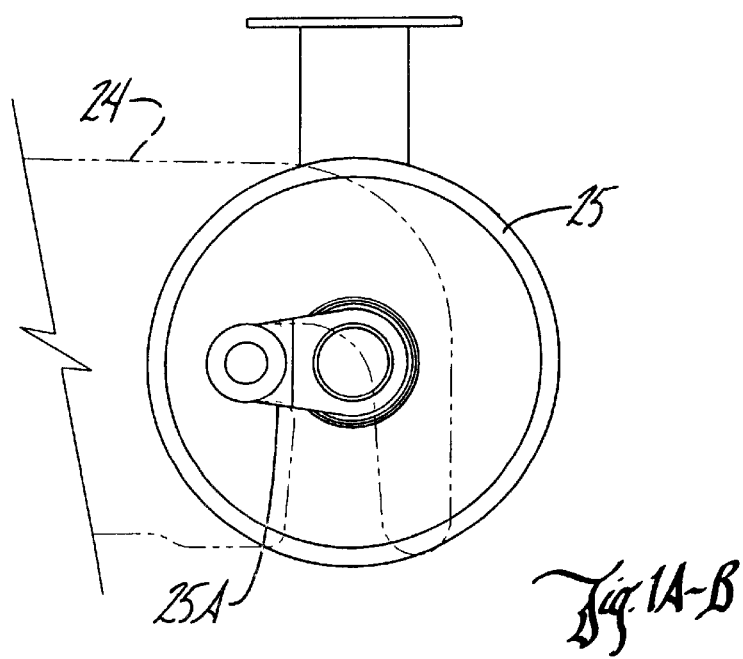
Fig. 1A-B

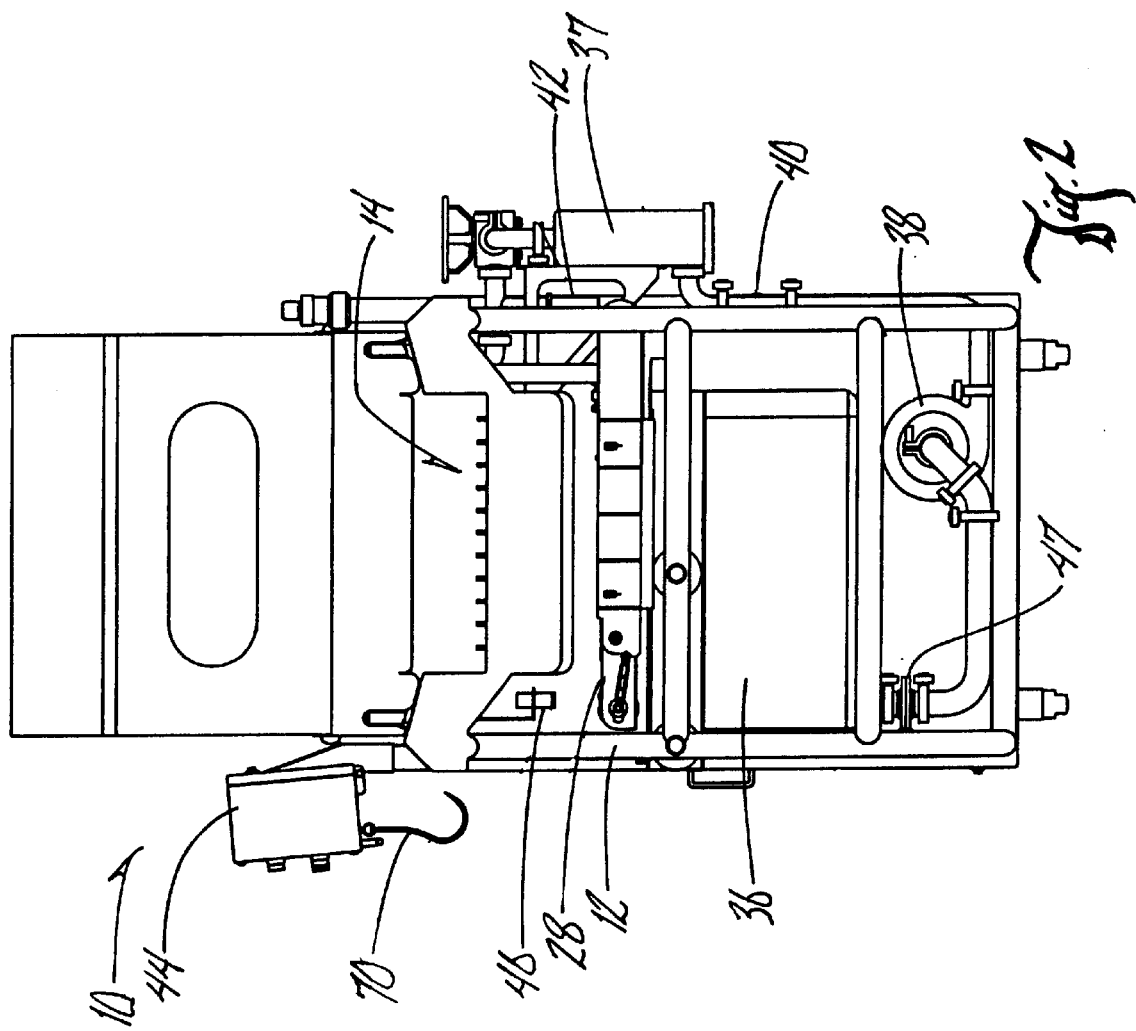

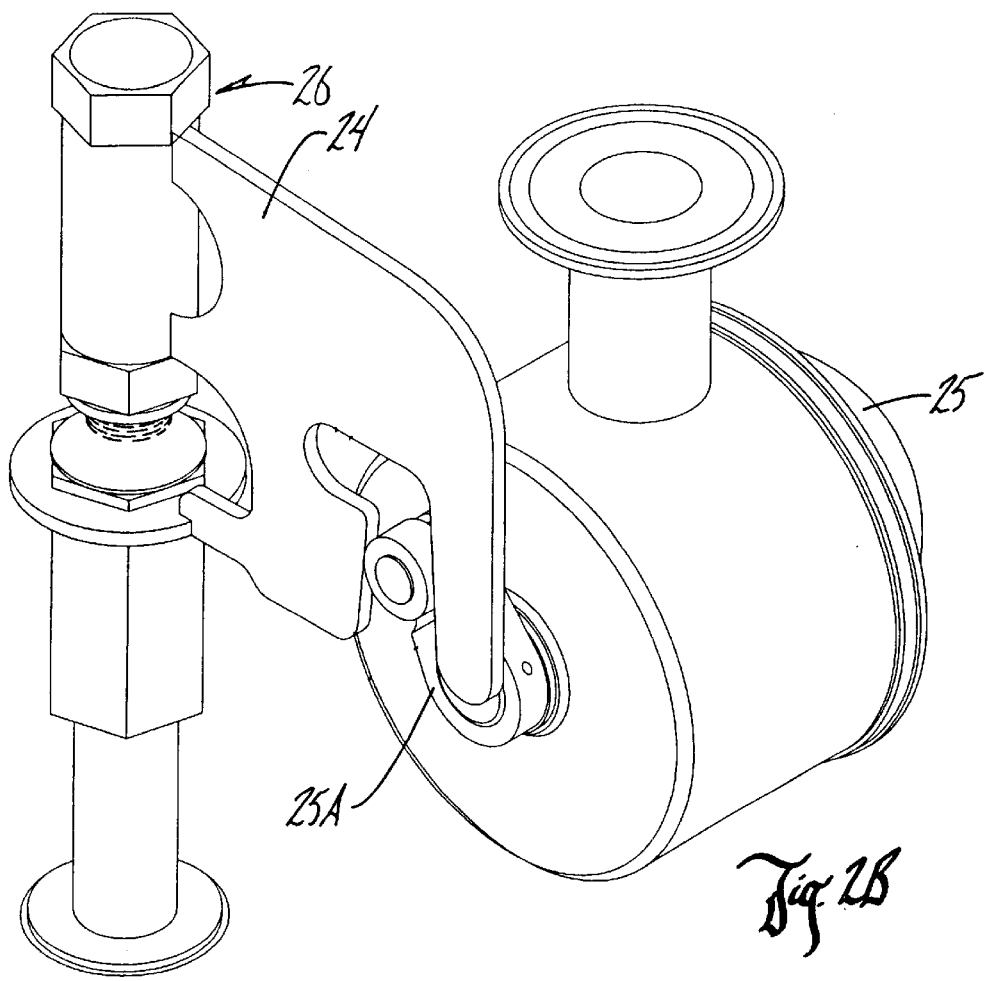
Fig. 2B
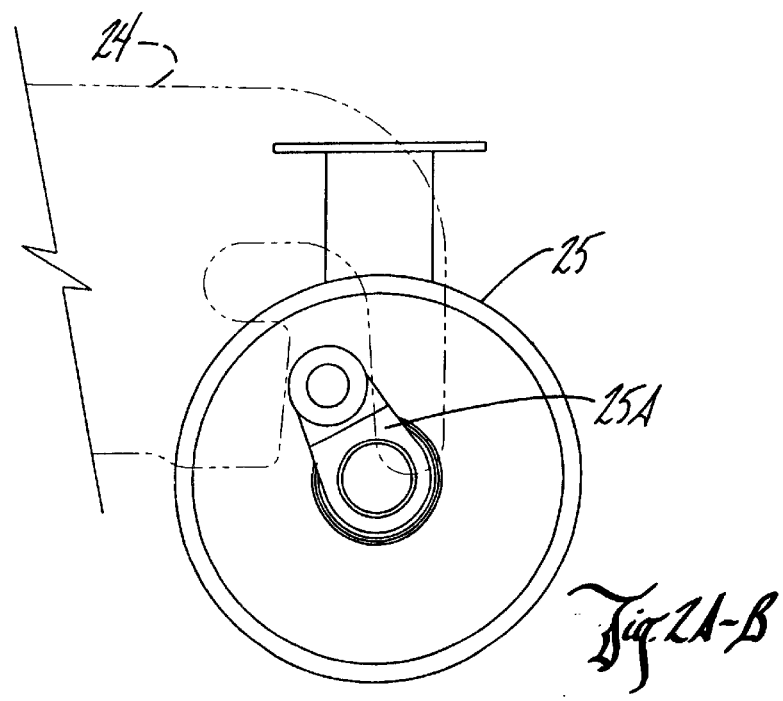
Fig. 2A-B

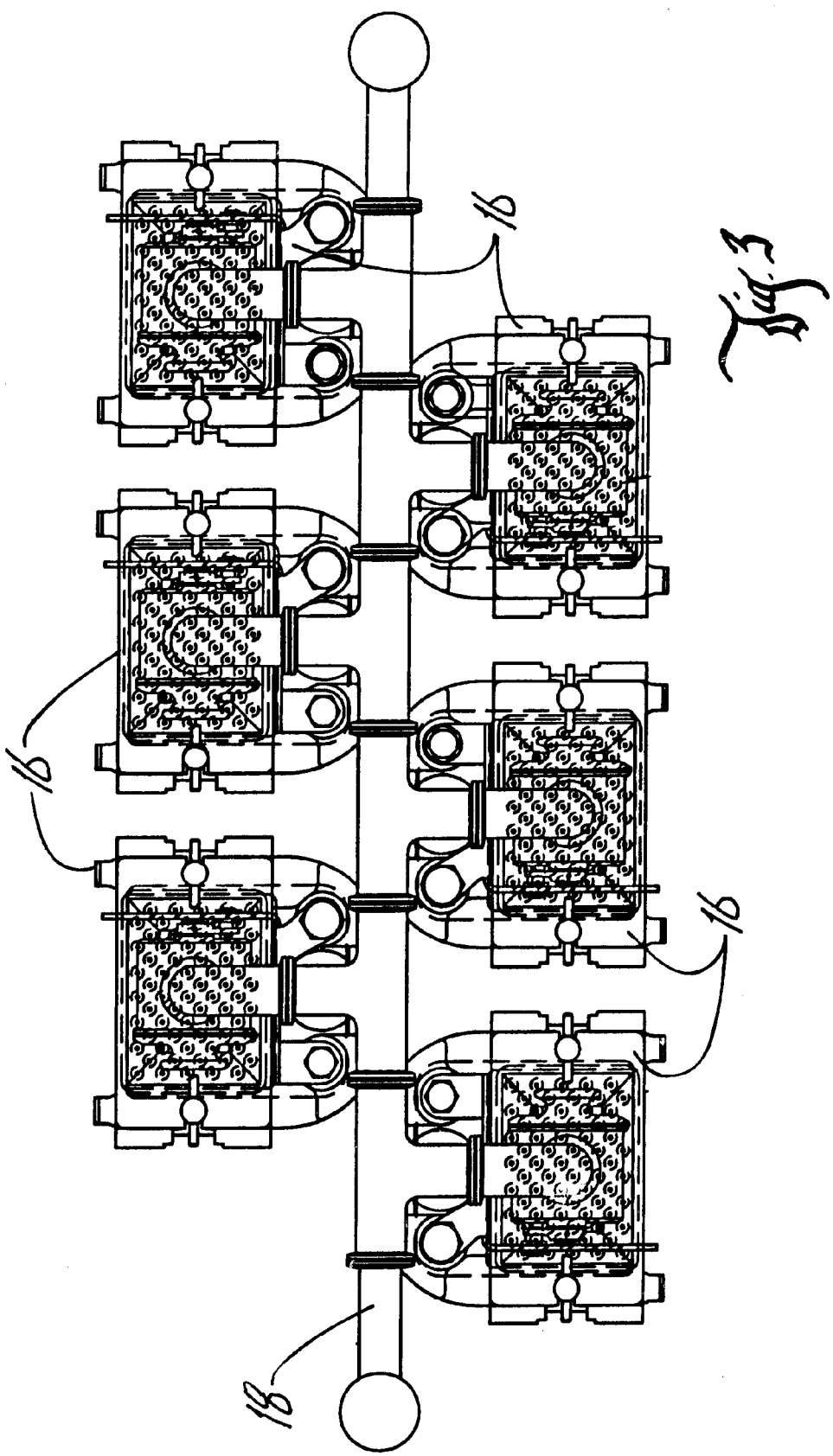

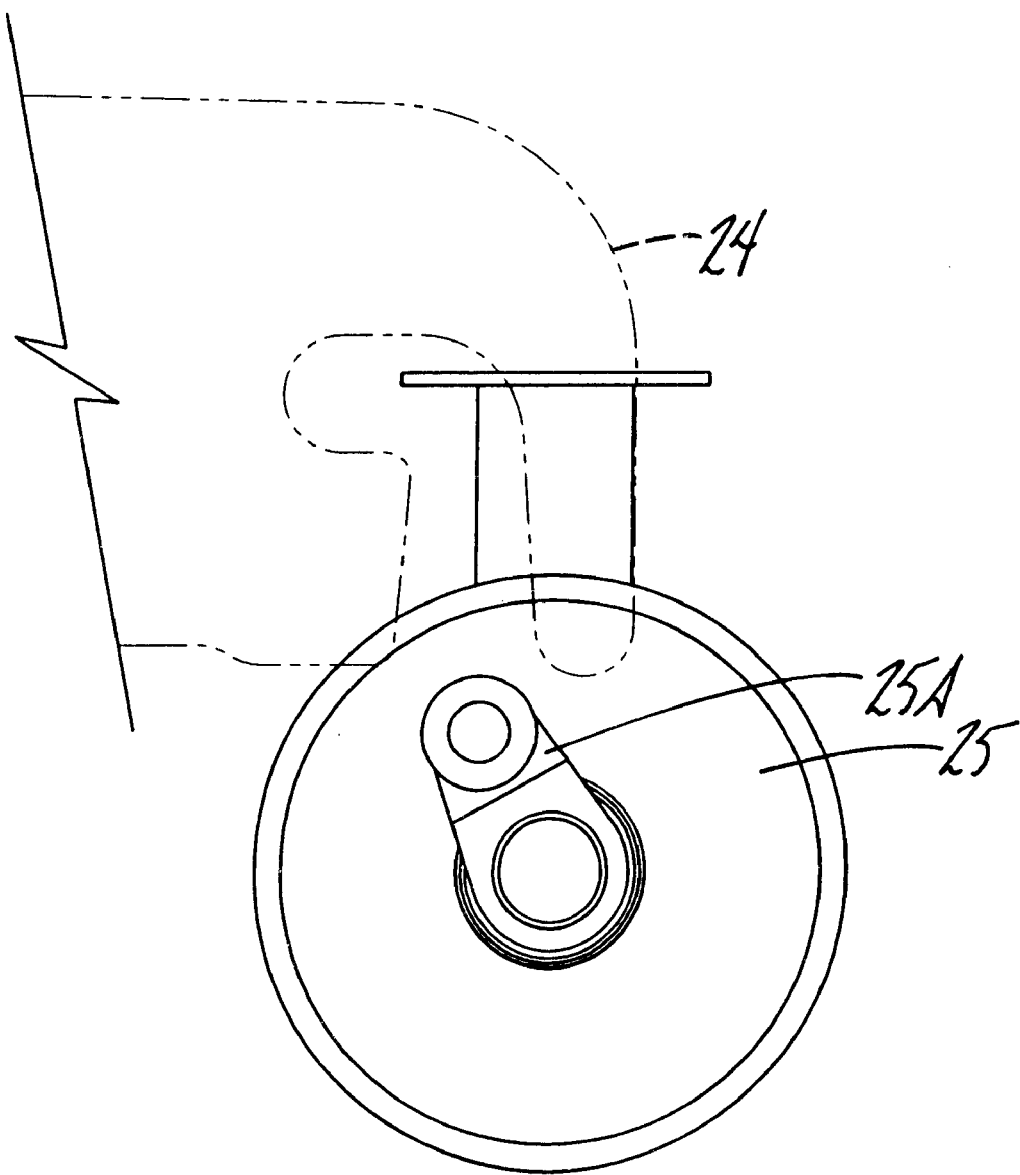
Fig. 3A-B

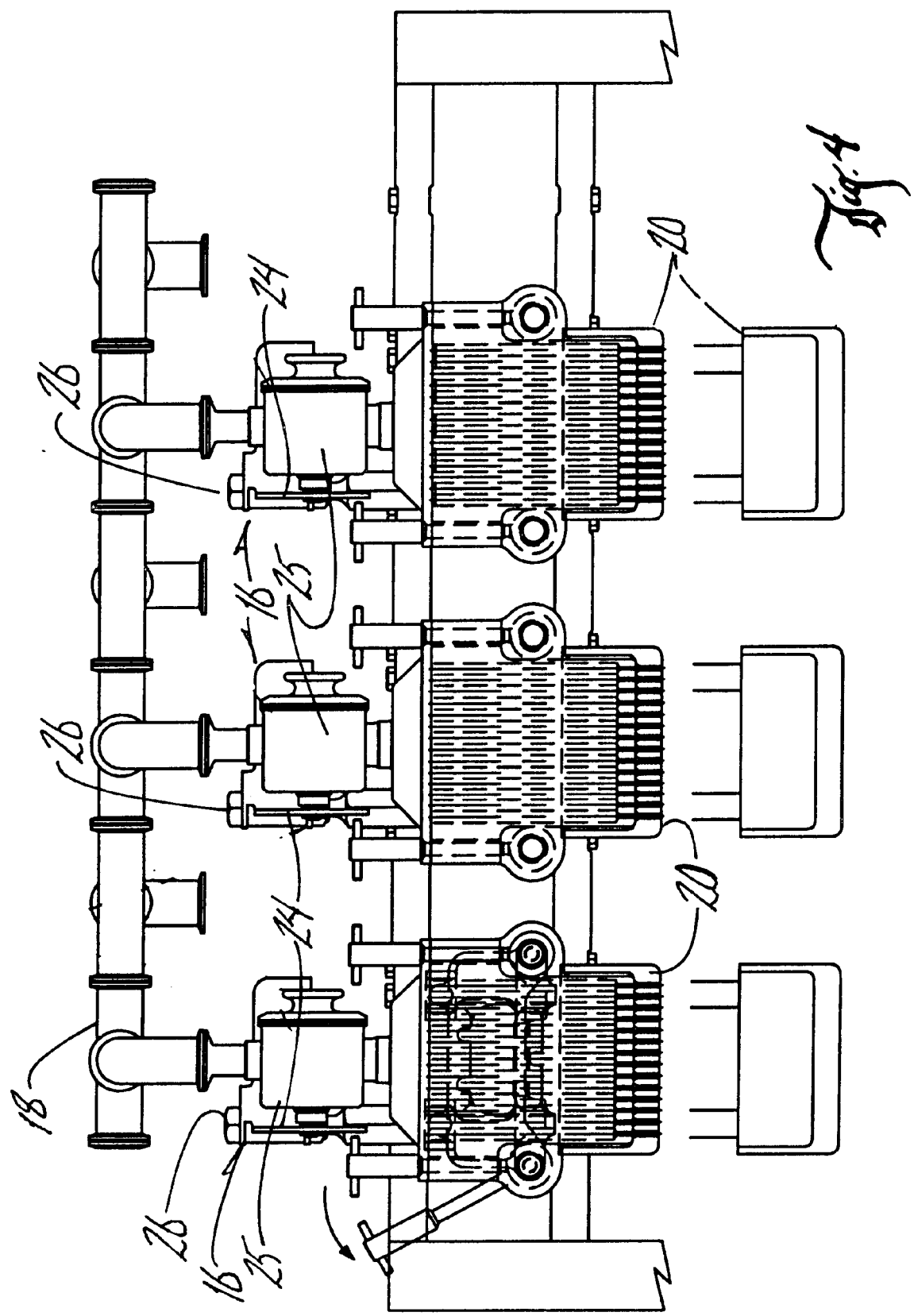

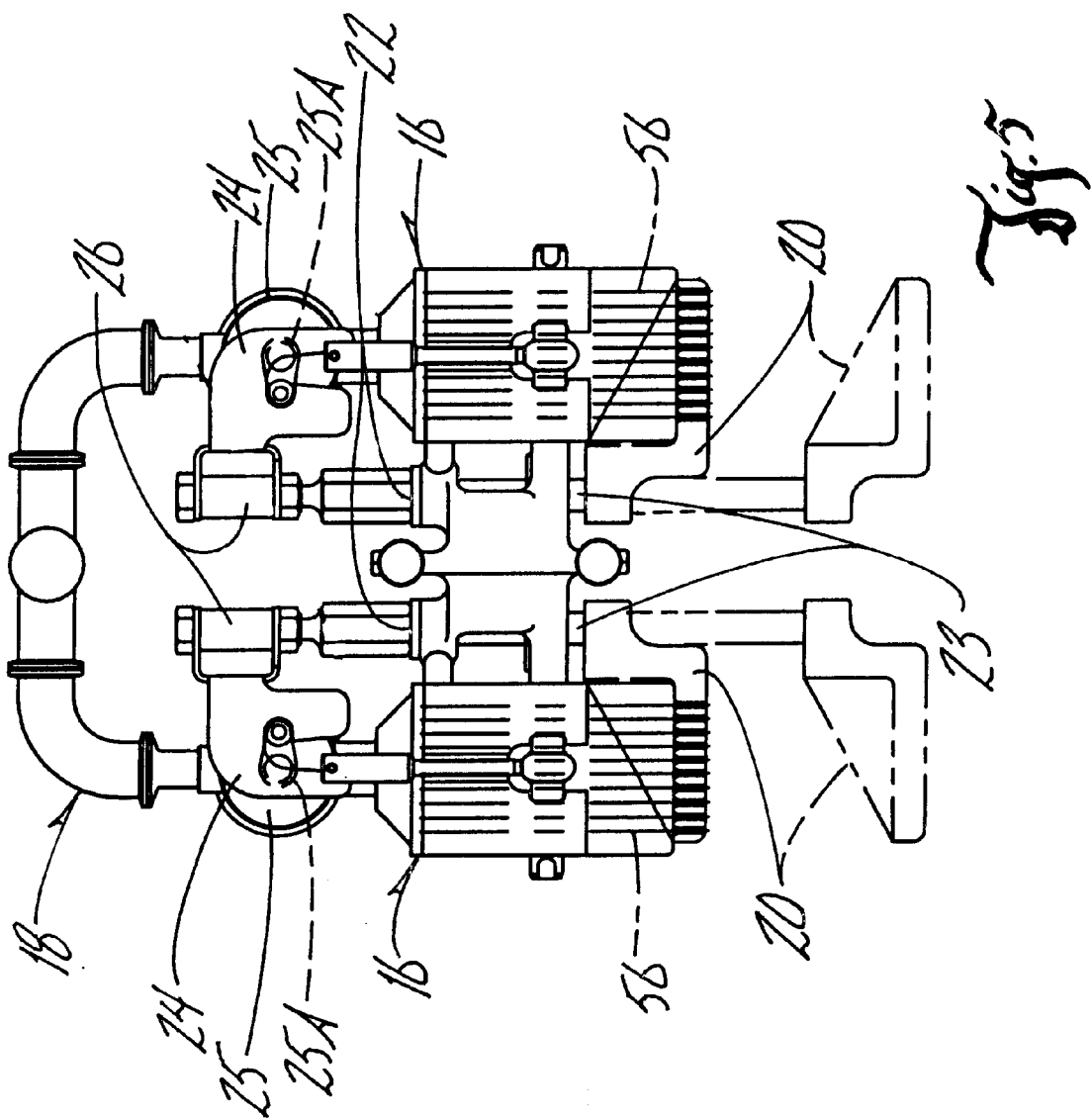

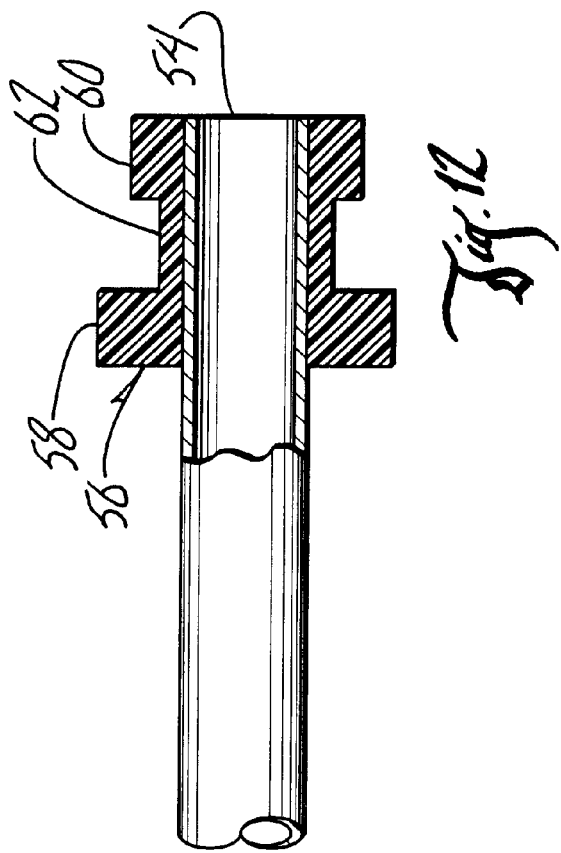
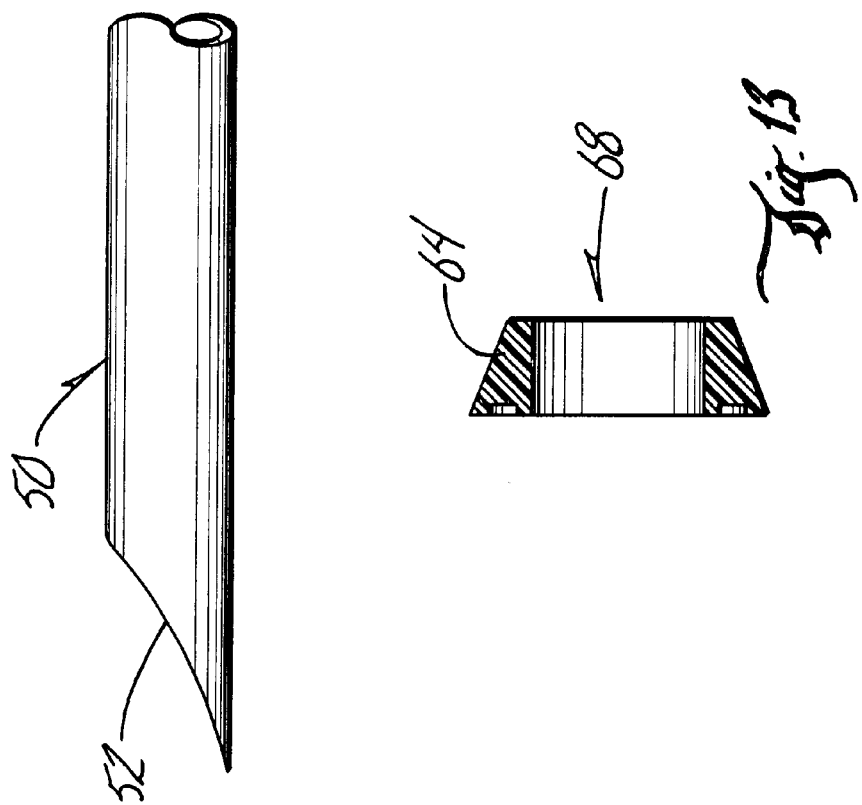

MEAT INJECTION MACHINE

CROSS REFERENCE TO A RELATED APPLICATION

This application is based upon Applicants' Provisional Application Ser. No. 60/285,353 filed Apr. 20, 2001.

BACKGROUND OF THE INVENTION

A meat injection machine is well known in the meat industry. It has a fluid manifold with a plurality of fluid reservoirs and group of injection needles associated with each reservoir. The purpose of these machines is to inject pickling solution into meat pieces at a pre-determined percentage rate.

Among the shortcomings of existing machines are wastage of injection fluid, often a brine material, lack of variable downward pressure on the meat product being injected; the absence of pneumatic power to move certain component parts; difficulty in cleaning and difficulty in filtering brine material causing a blockage of needles.

It is therefore a principal object of this invention to provide a meat product (meaning red meat, fish and poultry) injection machine that will overcome the above and other shortcomings of existing injection machines.

SUMMARY OF THE INVENTION

The meat injection machine 10 of this invention has a frame 12 with a horizontal conveyor 14 on the frame 12 for intermittently longitudinally moving meat products to be injected. A plurality of injector modules 16 are operatively associated with manifold 17 on a bridge 18 above the conveyor 14 and each has associated therewith a plurality of vertically disposed injection needles 50 which inject fluid into meat products. A stripper pad 20 on each module 16 cooperates with the needles 50 to hold the meat products in place and to facilitate the removal of the needles 50 from the meat products.

A first power means 22 is provided for raising and lowering a driven shaft 26 to permit insertion into and withdrawal of the needles 50 with respect to the meat products on the conveyor 14. Cam means 24 on shafts 26 are provided for adjusting the flow of valves 25 via crank arms 25A. Means are also provided for connecting the needles 50 with a source of fluid. The modules 16 are positioned in longitudinal and lateral staggered locations on the bridge 18 over the conveyor 14. A second power means 23 is provided to operate the stripper pad 20 and may be a pneumatic power means.

A continuous filter belt 28 extends longitudinally across and below a discharge end of the conveyor 14 for continuously filtering brine material from the needles 50 so that the brine material can be recycled and used again in the injection process. (FIGS. 1, 2, 8, and 9). This continuous filter belt 28 has one or more air knives 30 and 32 used to clean debris from the belt 28 and one or more water bars 34 also for cleaning which flush debris with cyclical bursts of water. The belt 28 is mounted to a subframe 29 of frame 12 by rollers 29A and 29B on opposite ends of the subframe 29. The subframe 29 is detachable from frame 12.

The tank 36 holding the brine contains within it a filter unit 36A (FIG. 10), to filter the brine before it enters the pump 38.

A third part of the filter system is in-line filter 37 (FIGS. 2 and 11). It is located after the pump 38 and before the needle modules 16. This filter 37 is flanked by two pressure sensors 40 and 42 in the system that monitor the condition of the filter. Fluid is routed through the filter 37 and as the filter 37 begins to fill up with particles the pressure (or flow or velocity) drop is monitored by the electronic controller. The electronic controller compensates for pressure (or flow or velocity) drop by increasing the speed of pump 38.

If the difference in pressures (and/or flow and/or velocity) reaches a programmably-predetermined variance, the operator screen 44A of operator interface 44 (where in the operator interface 44 may be an electronic controller) indicates the filter 37 is clogged and the flow should be changed to the other inline filer. This change can be accomplished automatically or manually. Once the flow has been rerouted the monitoring cycle begins again.

The brine system has a "continuous fill" system. The level of brine in the brine tank 36 is monitored by a level sensor 46 (FIGS. 1, 2, and 10). Programmable "fill" and "full" levels can be set and as the fluid reaches either level the sensor 46 signals. This acts in conjunction with the electronic controller 44 to operate a solenoid 48 for the brine fluid inlet valve 47.

The final stage of the filtration system is a mesh screen 27 inserted between the needle module 16 and the manifold head 17.

BRIEF DESCRIPTION OF THE DRAWINGS

FIG. 1 is a side elevational view of the injection machine of this invention;

FIG. 2 is an end elevational view thereof as seen from the right-hand end of FIG. 1;

FIG. 3 is a top plan view of the module units that extend upwardly from the center of the machine;

FIG. 4 is an elevational view as seen from the bottom of FIG. 3;

FIG. 5 is a sectional view of FIG. 3 looking in a direction from left to right;

FIGS. 12 and 13 are enlarged scale sectional views through a needle of this invention, and a sealing element respectively;

FIG. 1-B is a perspective view of a variable fluid control valve in a closed position;

FIGS. 1A–B is an end elevational view of the valve of FIG. 1-B;

FIG. 2-B is a view like FIG. 1-B with the valve in a intermediate position;

FIGS. 2A–B is an end elevational view of the valve of FIG. 2-B;

FIG. 3-B is a view similar to FIG. 1 with the valve in an open position; and

FIGS. 3A–B is an end elevational view of the valve of FIG. 3-B.

BRIEF DESCRIPTION OF THE PREFERRED EMBODIMENT

Figure 3B:
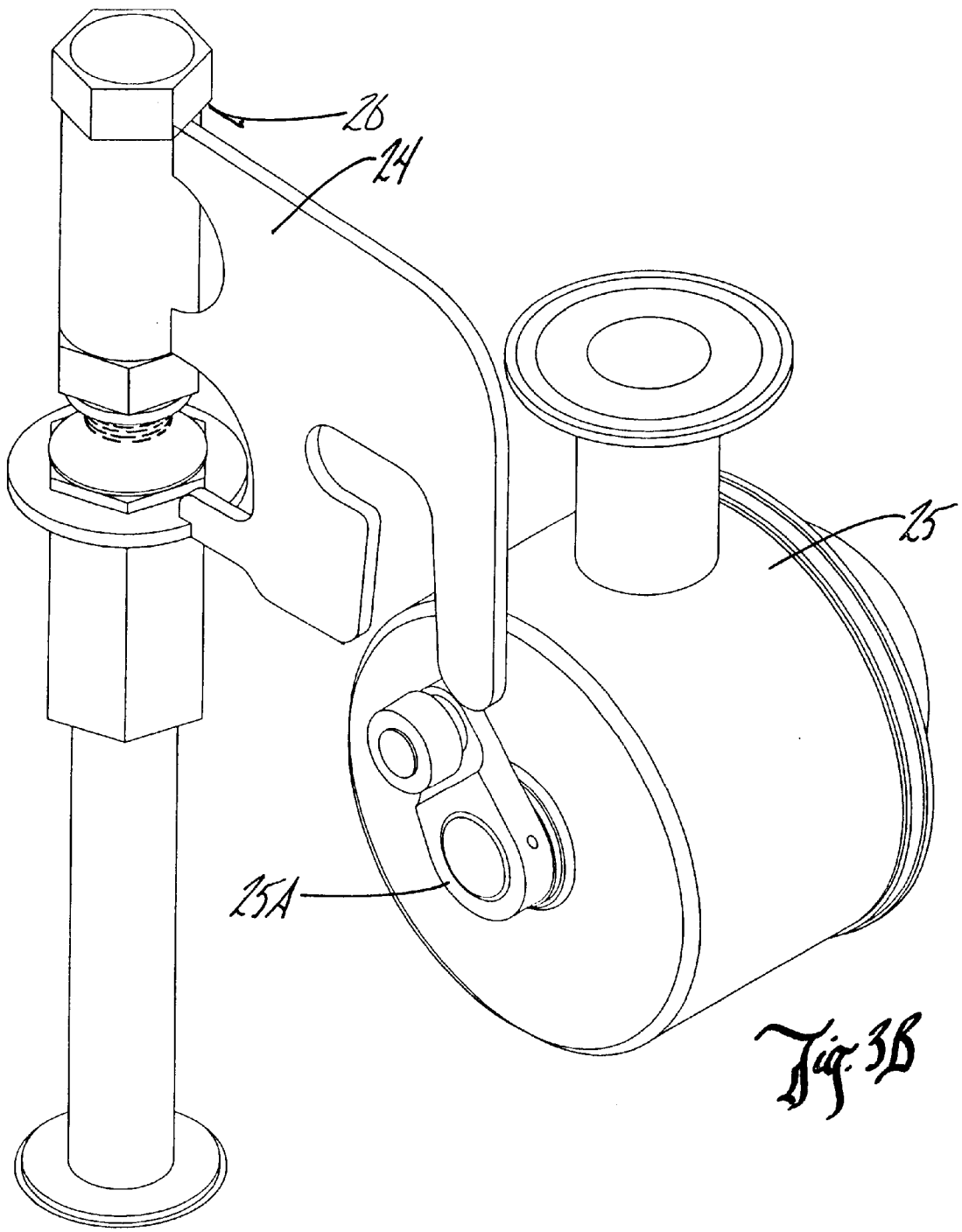
Figure 6:
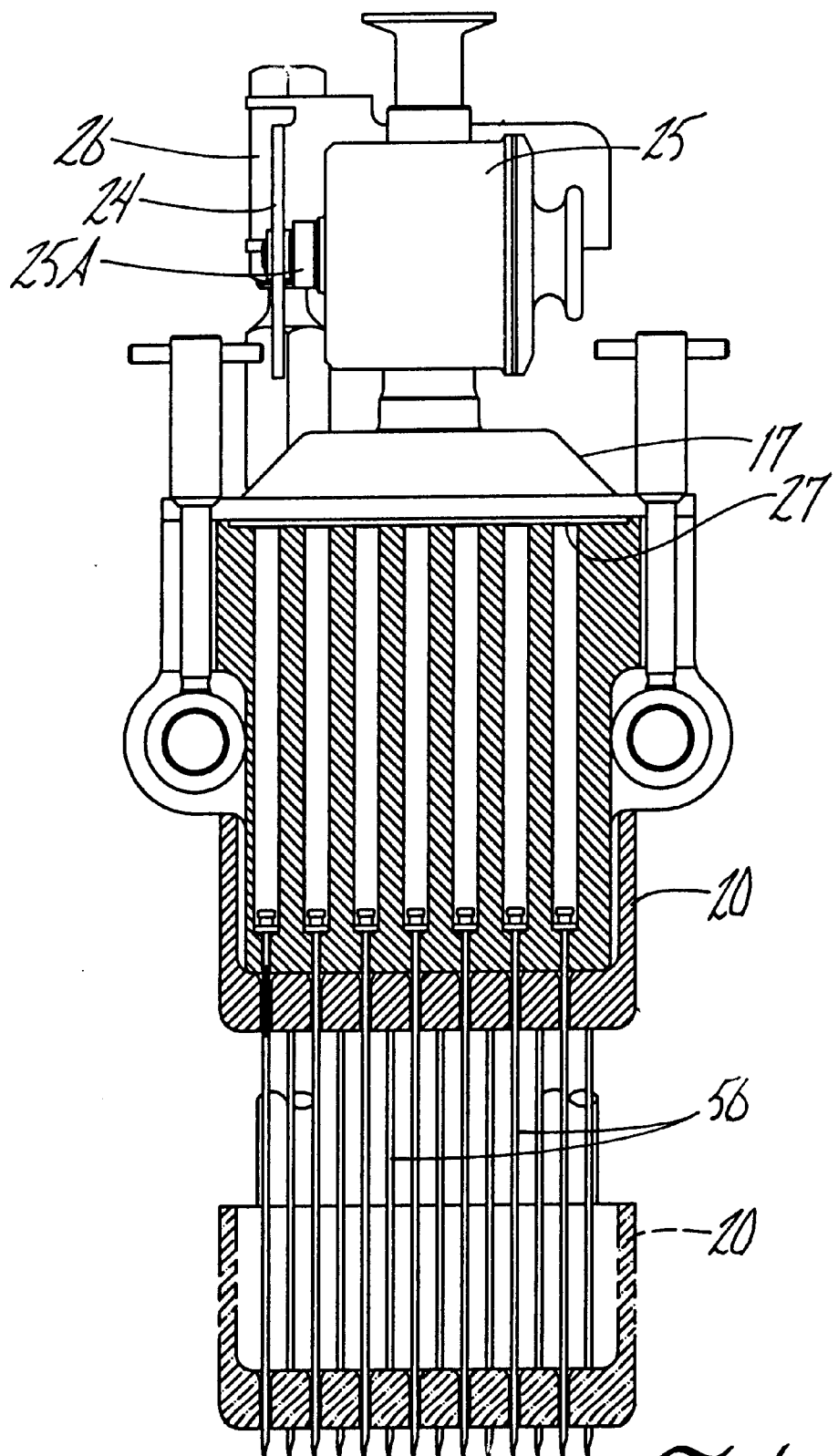
FIG. 6 is an enlarged scale sectional view showing one of the module units of FIG. 4.
Figure 7:
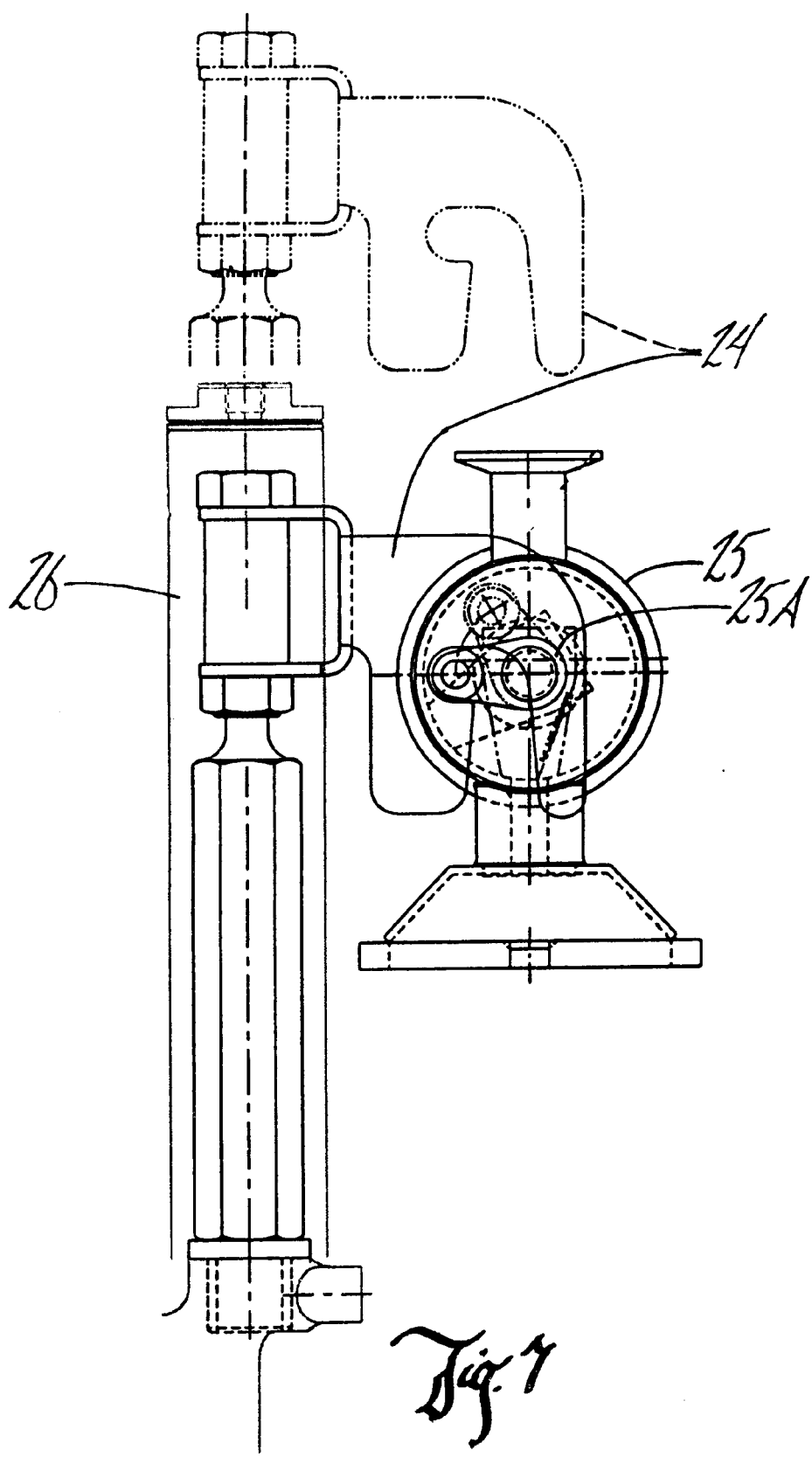
FIG. 7 is an enlarged elevational view of one of the cam structures shown in FIG. 5.

Referring to FIGS. 1–6, meat cuts (pork bellies for example) are placed upon the in-feed side of the injector 10. As the meat cut advances on the conveyor 14 (may be a walking beam conveyor) into the injection zone, the individual injector modules 16 come into contact with the meat. The injector modules 16 are staggered to optimize needle 50 pattern in the meat. It also minimizes unnecessary triggering of needles 50 when no product is present. These head modules 16 can be removed without tools.

As the modules 16 come into contact with the meat cuts, the needles 50 in the modules 16 penetrate the product. Stripper pads 20 trigger the release of fluid into the needles 50 and subsequently inject solution into the meat cuts. The needles 50 are of a unique design with plastic piston heads 56 rather than stainless steel for improved bearing surface.

Injection fluid solution (brine) is controlled separately in each zone by specially constructed cams 24 on driven shafts 26 which control the valves 25 but are not physically part of them. This allows for different height meat products to be run easily at the same time and changes can be made quickly to facilitate flexibility in product change. As the cycle completes, the stripper pads 20 hold the meat in place while the needles 50 are retracted. The stripper pads 20 are pneumatically controlled and adjustable separate from the driven shafts 26 via an operator interface 44 (touch) screen 44A. The stripper 20 itself is of a unique design in that it acts as a guide for the needles 50 when injecting and helps to minimize bent needles 50. It can be positioned at various heights for cleaning and inspection via the touch-screen 44A rather than manually as is the current practice for safe cleaning. There is also a function for dislodging of stuck products by increasing stripper 20 pressure momentarily and pushing product off of the needles 50.

The fluid supply system is of a unique design in that it is integrated into the body of the machine 10. All other known units have separate tanks. It also has an auto fill fluid supply system to fill the pickling tank 36 on demand and then closing the valve 47. A level sensor 46 detects the level of fluid and opens the valve 47 until the tank 36 is full. This prevents over filling and running dry.

Figure 8:
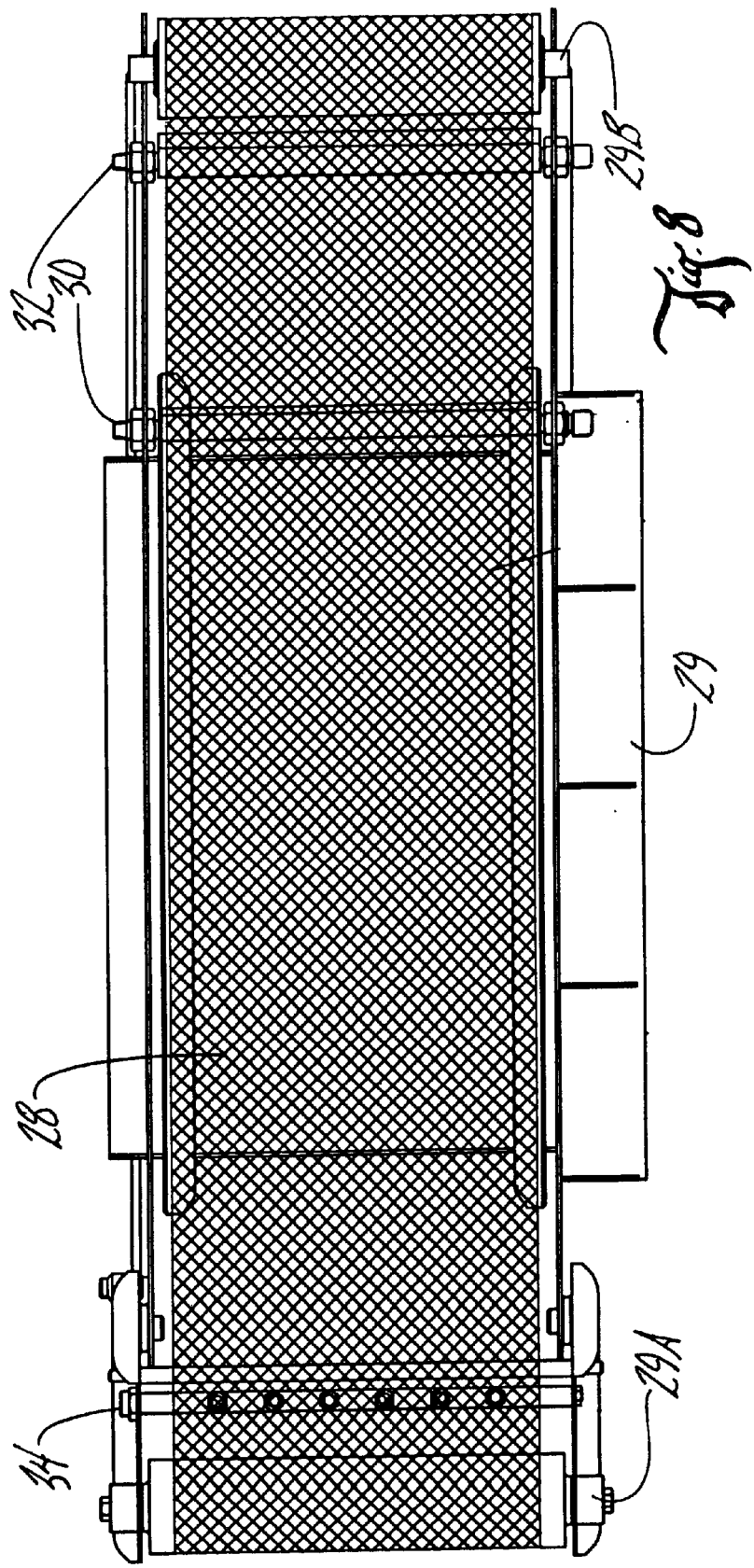
FIG. 8 is an enlarged scale plan view of the filter belt that extends transversely across the machine underneath the discharge end of the machine.
Figure 9:
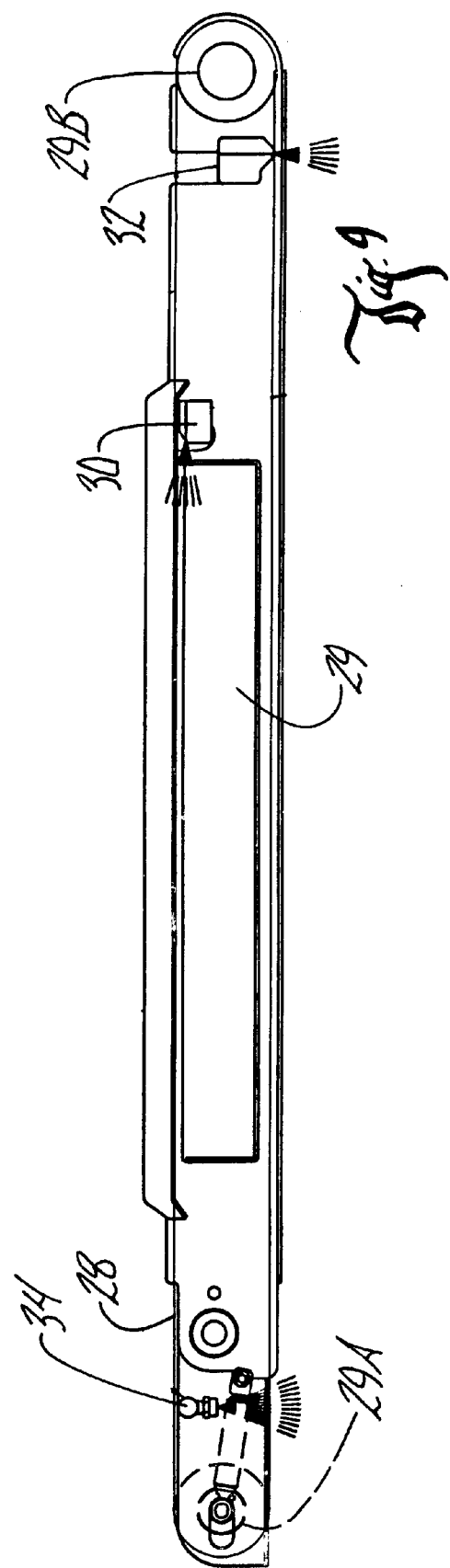
FIG. 9 is a side elevational view of FIG. 8.

Referring to FIGS. 8 and 9, the fluid supply system has a four stage filtering system. The return flow of brine fluid cascades over a mesh belt 28 which has fine openings (for example 350 micron openings, 34% open surface) (FIGS. 8, 9). This belt 28 is moving and continuously being cleaned by one or more air knives 30 and 32, and one or more water bars 34. The belt 28 is mounted to a subframe 29 of frame 12 by rollers 29A and 29B on opposite ends of the subframe 29. The subframe 29 is detachable from frame 12.

Figure 10:
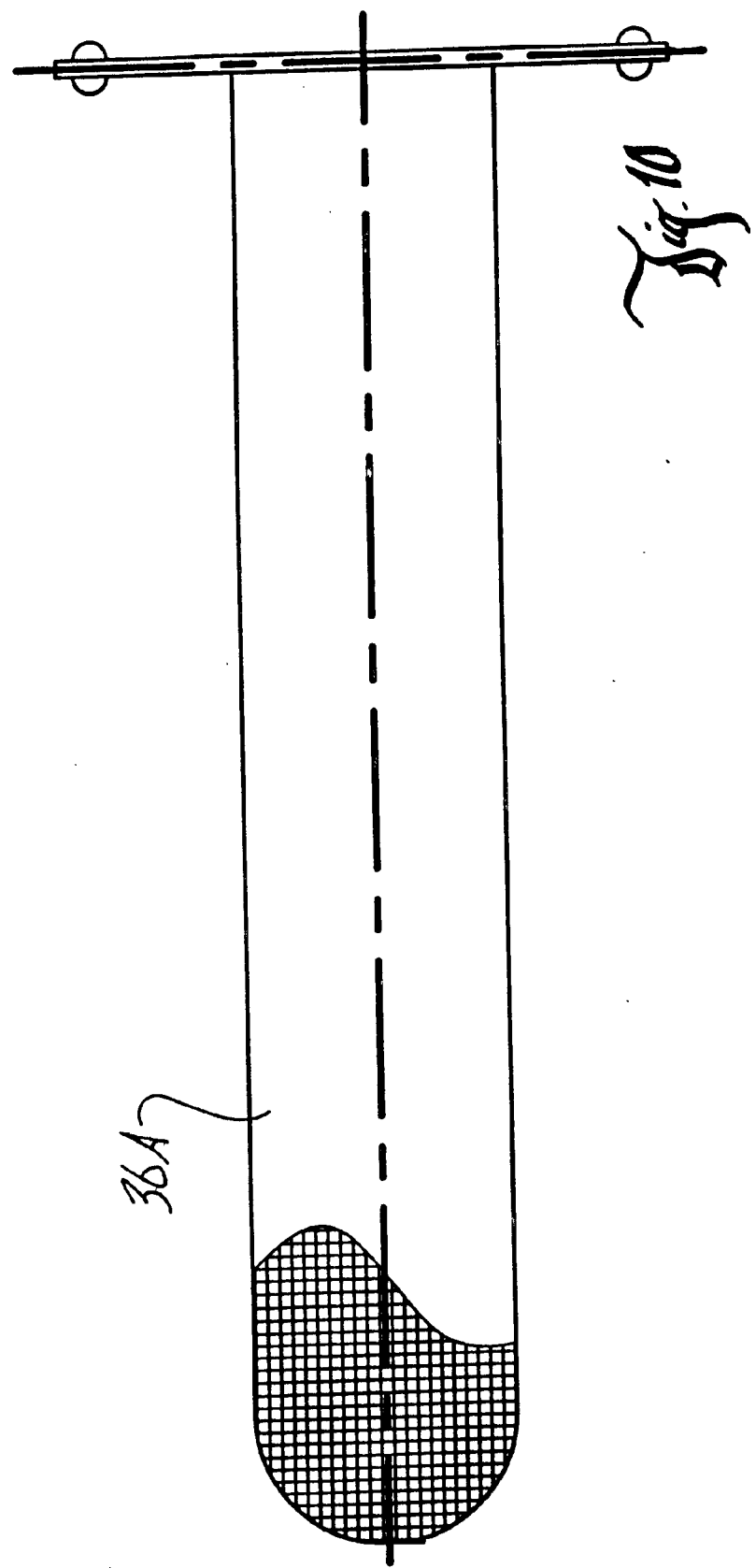
FIG. 10 is a partial sectional view at an enlarged scale of the filter in the brine tank.
Figure 11:
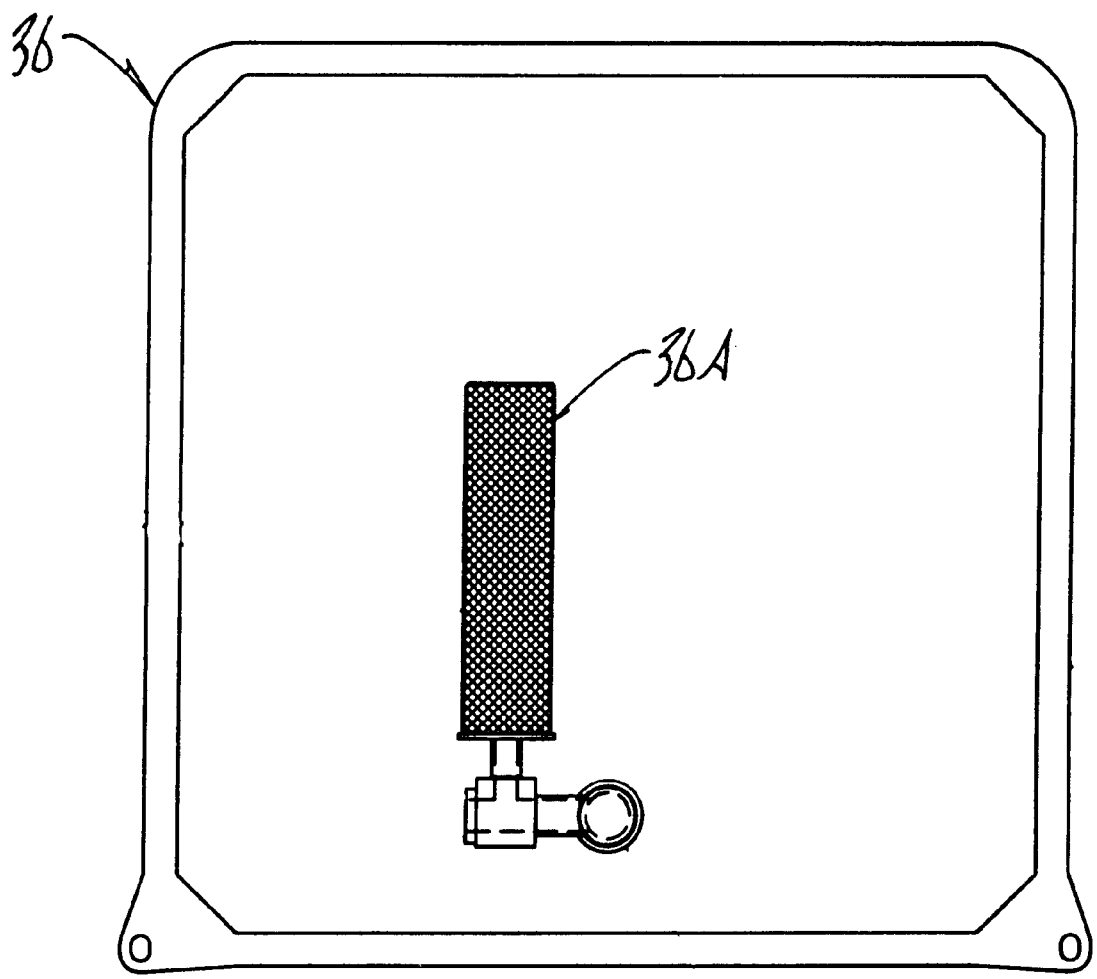
FIG. 11 is a partial plan view of the brine tank in FIG. 10, with the filter belt removed.
Figure 14:
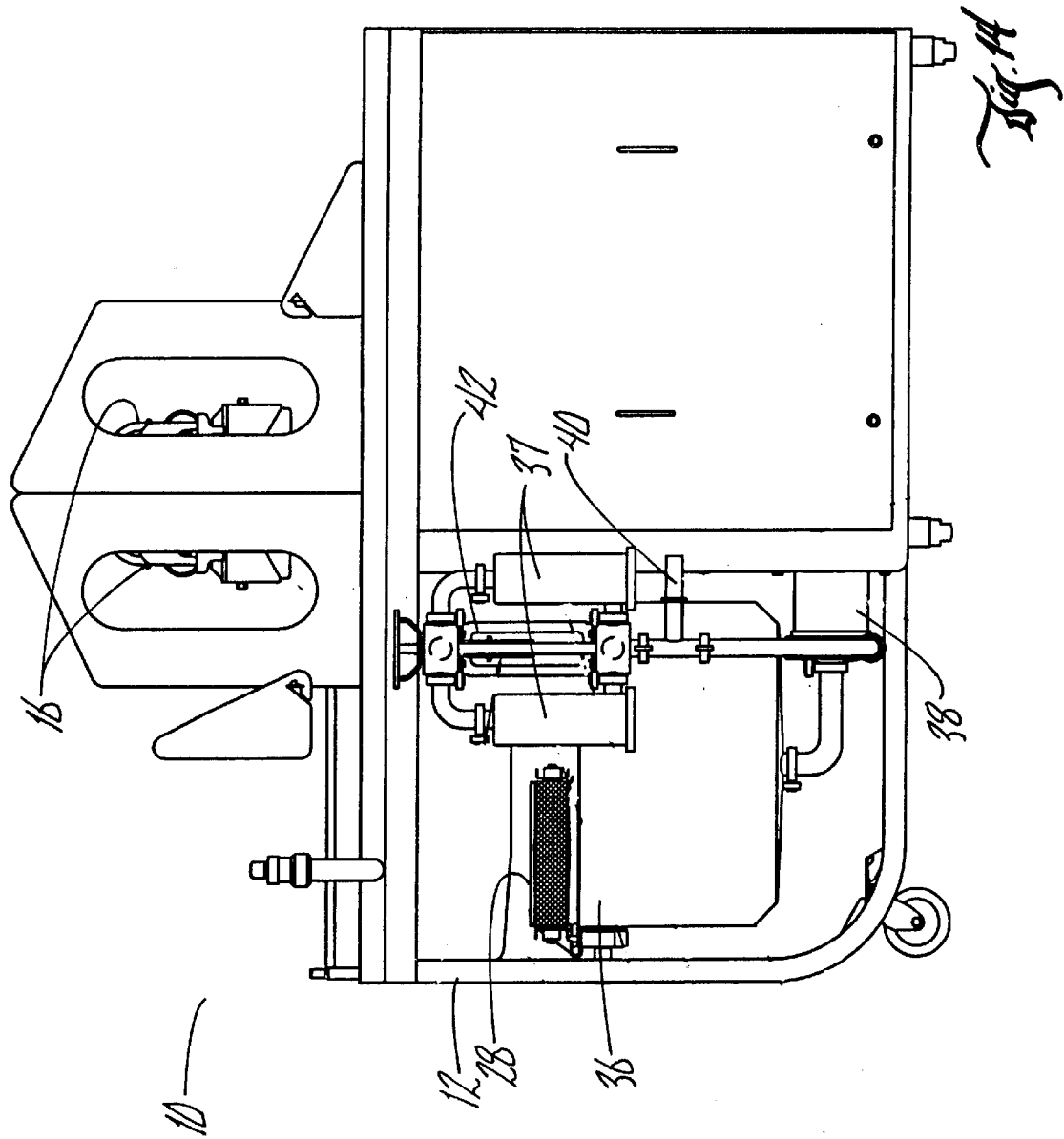
FIG. 14 is a side elevation view of the injection machine as seen from the back side of FIG. 1.

Referring to FIGS. 1 and 14, there are two pressure sensors 40 and 42 on either side of dual inline canister filters 37 which are connected to the central control mechanism 44. Flow or velocity sensors can achieve the same effect. These sensors 40 and 42 monitor the condition of the filters 37 by pre-measuring the fluid pressure (and/or flow and/or velocity) difference before and after the filters 37. Fluid is routed through one of the filters 37 and as the filter 37 begins to fill up with particles, the pressure (and/or flow and/or velocity) drop is monitored by the electronic controller 44. The electronic controller 44 compensates for the pressure (and/or flow and/or velocity) drop by increasing the pump 38 speed. Once the difference in pressures (and/or flow and/or velocity) reaches a predetermined variance, the operator screen 44A gives a visual warning. The fluid can then be re-routed manually or automatically through the other canister filter 37. If the fluid is not re-routed, the condition continues for a programmed pre-determined period, and then the machine 10 will shut down. Referring to FIGS. 10 and 11, a filter unit 36A is located inside of the brine tank 36, inline between the tank 36 and the pump 38, to catch any debris and stop them from damaging the pump 38.

Referring back to FIGS. 1–6, the pump 38, which supplies fluid pressure to the needles 50, is a centrifugal pump rather than positive displacement. It has a fixed orifice bypass back to the tank 36 in order to maintain the flow within control limits when the valves 25 are in the closed position.

As shown in FIG. 5, a driven shaft 26 with offset cam 24 provides the up/down motion of the needles 50. A conveyor 14 advances the meat cuts dependent upon the position of the needles 50 in injector module 16.

The position sensor 14 in conjunction with the electronic controller 44 always knows the vertical position of the needles 50 relative to the conveyor 14. Therefore the shaft 26 can be stopped or started without homing, provided the main power has never been disconnected. A variable main drive controls how fast the shaft 26 goes up and down. Control of the conveyor 14 is "slaved" off the shaft 26 so that the conveyor 14 is never moving while needles 50 are in the product. Conversely, the injector module 16 could be "slaved" off the conveyor 14 with the same result. The main drive is coupled to a brake to hold the shaft 26 in any position for safety reasons.

Once the meat product has been injected and the needles 50 have lifted out of the meat via the stripper 20 action, the meat continues out of the machine 10. This machine 10 has the unique feature of one or more weighing devices 70 built into the machine 10. This information can be used to adjust the injection percent either manually or automatically, to reach a predetermined target percent. These weighing devices 70 may be integrated into the conveyor 14.

The needle 50 (FIG. 12) of this invention is elongated, hollow, and made of stainless steel or the like. Its lower end 52 is open and sharp and penetrates the meat product. Its upper end 54 is open and is surrounded by head 56 which is molded in place around the needle. The head 56 has upper and lower shoulders 58 and 60, respectively, spaced by annular groove 62. The diameter of shoulder 58 is larger than that of shoulder 60, with the diameter of groove 62 being smaller than both shoulders 58 and 60. Flexible seal 64 (rubber or the like) has an aperture 68 that can be force fit into groove 62. The seal 64 in FIG. 13 is drawn at an enlarged scale.

It is therefore seen that this invention will achieve at least all of its stated objectives.

What is claimed is:

1. A meat injection apparatus, comprising, a frame, a horizontal conveyor on the frame for intermittently longitudinally moving meat products to be injected, a plurality of injector modules on the bridge over the conveyor, a plurality of vertically disposed injection needles on each module, first power means for raising and lowering a driven shaft operatively associated with the needles to permit insertion into and withdrawal of the needles with respect to meat products on the conveyor, means for connecting the needles with a source of fluid, the modules being in longitudinal and lateral staggered positions over the conveyor.

2. The apparatus of claim 1 wherein a second power means exerts a downward force on stripper pad associated with the modules.

3. The apparatus of claim 1 wherein the second power means is a pneumatic power means.

4. The apparatus of claim 2 wherein a control means is on the frame for varying the downward force on each of the stripper pads.

5. The apparatus of claim 1 wherein means are provided to allow the release of fluid through the needles of a module only if a meat product is present on the conveyor below that module.

6. A meat apparatus machine, comprising, a frame, a horizontal conveyor on the frame for intermittently longitudinally moving meat products to be injected, a plurality of injector modules on the bridge over the conveyor, a plurality of vertically disposed injection needles on each module, power means for raising and lowering a driven shaft operatively associated with the needles to permit insertion and withdrawal of the needles with respect to meat products on the conveyor, means for connecting the needles with a source of fluid, wherein a second power means exerts a downward force on a stripper pad associated with the modules, and wherein the second power means is a pneumatic power means for the stripper pad.

7. The apparatus of claim 1 wherein the source of fluid is governed by separate cam controlled valves.

8. The apparatus of claim 2 wherein each module includes stripper pads through which the needles extend and which are independently pneumatically controlled for upper and downward movement by a control means.

9. A meat injection apparatus, comprising, a frame, a horizontal conveyor on the frame for intermittently longitudinally moving meat products to be injected, a plurality of injector modules on the bridge over the conveyor, a plurality of vertically disposed injection needles on each module, power means for raising and lowering a driven shaft operatively associated with the needles to permit insertion and withdrawal of the needles with respect to meat products on the conveyor, means for connecting the needles with a source of fluid, an endless horizontal filter belt mounted on the frame underneath the conveyor, means for directing fluid passing from the needles and a meat product on the conveyor to the filter belt, the belt being comprised of a filter material with small openings therein to permit fluid to pass through but to cause solids in the fluid to be deposited on a horizontal surface of the belt, means for collecting fluid passing through the belt, means adjacent the belt for removing and disposing of solids deposited on the belt.

10. The apparatus of claim 9 wherein the belt is mounted on a subframe of the frame, by rollers on opposite ends of the subframe, the subframe being detachable from the frame.

11. The apparatus of claim 9 wherein one end of the subframe can be selectively pivoted with respect to the remainder of the subframe to permit easy removal of the belt from the subframe.

12. The apparatus of claim 9 wherein the belt is comprised. of a polyester material, with 200–500 micron openings and having a 10%–90% open surface.

13. The apparatus of claim 9 wherein the means for collecting the fluid from the belt is a tank below the belt.

14. The apparatus of claim 1 wherein a pump is located on the frame and is connected by a fluid circuit to the tank and to reservoirs on each module.

15. The apparatus of claim 13 wherein a cylindrical filter means is imposed in the fluid circuit between the tank and the pump.

16. The apparatus of claim 15 wherein a final filter screen is located in the fluid circuit upstream of the reservoirs of the modules.

17. The apparatus of claim 9 wherein the belt has openings 350 microns in size.

18. The apparatus of claim 1 wherein the filter system associated with the source of fluid wherein the filter system consists of dual filters mounted such that the apparatus will continue to run when one of the filters is off line.

19. The apparatus of claim 18 wherein the pressures of fluid in the filter system are monitored by sensors on opposite sides of the filter, each of which automatically contacts an electronic controller and to cause the electronic controller to compensate for a fluid pressure drop over the system.

20. The machine of claim 19 wherein the electronic controller can automatically notify the operator when filters need attention.

21. The machine of claim 9 wherein the pressure system is monitored by sensors on opposite sides of the filter, each of which automatically contact an electronic controller to shut down the system at a pre-determined fluid pressure change.

22. The machine of claim 1, where said fluid system has a continuous fill system wherein the level of brine in the brine tank is monitored by a level sensor whereby programmable fill and full levels can be set so that as the fluid reaches either level the sensor signal in conjunction with the electronic controller determines when to operate a solenoid for the brine fluid inlet valve.

23. The apparatus of claim 1 wherein the needles are comprised of an elongated hollow metal needle element having open upper and lower ends, a plastic head element on the upper end of the needle, the head being adhered to the upper end of the needle by molding the head around the open upper end of the needle with the open upper end being exposed to received fluid when used in a meat injection machine.

24. The needles of claim 23 wherein the head has an upper shoulder of intermediate diameter, a lower shoulder of greater diameter, and a central annular groove having a diameter less than that of either the upper and lower shoulders.

25. The needle of claim 24 wherein a flexible sealing element is mounted in the annular groove.

26. The needle of claim 23 wherein the needle is shaped to provide a good bond for the plastic head when it is injection molded to the needle.

\* \* \* \* \*